(12) United States Patent
Choi

(10) Patent No.: US 10,181,269 B2
(45) Date of Patent: Jan. 15, 2019

(54) TOUCH SCREEN DEVICE HAVING BRAILLE SUPPORT FUNCTION AND CONTROL METHOD THEREFOR

(71) Applicant: Han Sol Choi, Ulsan (KR)

(72) Inventor: Han Sol Choi, Ulsan (KR)

( * ) Notice: Subject to any disclaimer, the term of this patent is extended or adjusted under 35 U.S.C. 154(b) by 15 days.

(21) Appl. No.: 15/441,642

(22) Filed: Feb. 24, 2017

(65) Prior Publication Data

US 2017/0169730 A1 Jun. 15, 2017

Related U.S. Application Data

(63) Continuation of application No. PCT/KR2015/008885, filed on Aug. 25, 2015.

(30) Foreign Application Priority Data

Sep. 11, 2014 (KR) .................. 10-2014-0120380
Sep. 25, 2014 (KR) .................. 10-2014-0128480

(51) Int. Cl.

| G09B 21/02 | (2006.01) |
|---|---|
| G06F 3/041 | (2006.01) |
| G06F 3/0488 | (2013.01) |
| G09B 21/00 | (2006.01) |
| G06F 3/01 | (2006.01) |

(52) U.S. Cl.
CPC .............. *G09B 21/02* (2013.01); *G06F 3/016* (2013.01); *G06F 3/0416* (2013.01); *G06F 3/04886* (2013.01); *G09B 21/001* (2013.01); *G06F 2203/04803* (2013.01)

(58) Field of Classification Search
None
See application file for complete search history.

(56) References Cited

U.S. PATENT DOCUMENTS

2012/0007809 A1* 1/2012 Mahalingam ........ G09B 21/003
345/173

FOREIGN PATENT DOCUMENTS

| JP | 2008-124599 A | 5/2008 |
|---|---|---|
| JP | 2012-64066 A | 3/2012 |
| KR | 10-2009-0030537 A | 3/2009 |
| KR | 10-1123212 B1 | 3/2012 |
| KR | 10-1371325 B1 | 3/2014 |
| KR | 10-2014-0081423 A | 7/2014 |

\* cited by examiner

*Primary Examiner* — Kenneth B Lee, Jr.
(74) *Attorney, Agent, or Firm* — Mintz Levin Cohn Ferris Glovsky and Popeo, P.C.; Kongsik Kim; Jhongwoo Jay Peck

(57) ABSTRACT

The present invention relates to a touch screen device having a braille support function and a control method therefor, the touch screen device including: a touch screen sensing a touch location of a user; and a controller entering at least one of a first mode and a second mode according to a use direction of the touch screen, the controller recognizing the touch screen as one braille cell in the first mode, and recognizing the touch screen as two braille cells in the second mode, thereby receiving braille input depending on the touch location of the user. By using this, it is possible to easily and precisely input six-dot braille on a touch screen and to input abbreviations and symbols of a twelve-dot system.

16 Claims, 11 Drawing Sheets

FIG. 3

| consonant | | | | | | | | | | | | | | |
|---|---|---|---|---|---|---|---|---|---|---|---|---|---|---|
| | g | n | d | r,l | m | b | s | o,<br>ng | j | ch | k | t | p | h |
| initial<br>consonants | ⠈ | ⠉ | ⠊ | ⠐ | ⠑ | ⠘ | ⠠ | ⠶ | ⠨ | ⠰ | ⠋ | ⠓ | ⠕ | ⠚ |
| final<br>consonants | ⠁ | ⠒ | ⠔ | ⠂ | ⠢ | ⠃ | ⠄ | ⠶ | | ⠆ | ⠅ | ⠇ | ⠏ | ⠗ |

FIG. 4

FIG. 5

TOUCH SCREEN DEVICE HAVING BRAILLE SUPPORT FUNCTION AND CONTROL METHOD THEREFOR

CROSS-REFERENCE TO RELATED APPLICATION

This application is a continuation application of International Application No. PCT/KR2015/008885 filed on Aug. 25, 2015, which claims priority to Korean Application No. 10-2014-0120380 filed on Sep. 11, 2014 and Korean Application No. 10-2014-0128480 filed on Sep. 25, 2014. The applications are incorporated herein by reference.

TECHNICAL FIELD

The present invention relates to a touch screen device having a braille support function and control method therefor. More particularly, the present invention relates to a touch screen device having a braille support function and control method therefor, whereby six-dot braille and abbreviations and symbols of a twelve-dot system can easily and precisely be input on a touch screen.

BACKGROUND ART

A touch screen device is a display device to which a touch screen input method is applied, the method for touching letters or specific locations on a screen without using a keyboard. The touch screen device is widely used in various fields such as computer devices, mobile communication terminals, kiosk terminals, car AV systems, etc. In addition, the touch screen input method is applied to most ATM machines for cash withdrawal, guide computer devices in public places, etc.

However, unlike physically configured buttons, it is impossible to for a user to perceive touching a displayed button or key when using a touch screen. Therefore, it is difficult for a visually handicapped user or a poor-eyesight user to see what he or she inputs. Particularly, in the case of smart phones become, input is performed by displaying a keyboard on a touch screen. Thus, it is difficult for a visually handicapped user to input text, etc.

In order to solve such problems, conventionally, when a keyboard on a touch screen is touched with a finger, a voice is output to support input; however, it is still difficult for a visually handicapped person to touch a precise location.

Therefore, there is a demand for that a technology for easily and precisely inputting letters by using braille on a touch screen.

SUMMARY

The present invention has been proposed to solve the problems in the related art. The present invention is intended to propose a touch screen device having a braille support function and control method therefor, whereby six-dot braille and abbreviations and symbols of a twelve-dot system can easily and precisely be input on a touch screen.

In order to achieve the above object, according to one aspect of the present invention, there is provided a touch screen device including: a touch screen sensing a touch location of a user; and a controller entering at least one of a first mode and a second mode according to a use direction of the touch screen, the controller recognizing the touch screen as one braille cell in the first mode, and recognizing the touch screen as two braille cells in the second mode, thereby receiving braille input depending on the touch location of the user.

Here, the controller may enter the first mode when the touch screen is used in a longitudinal direction, and match the touch location of the user to six-dot braille based on both four sides of the touch screen and a virtual division line dividing the touch screen, thereby receiving the braille input.

In addition, the controller may enter the second mode when the touch screen is used in a transverse direction, divides the touch screen into a first region and a second region, and may match the touch location of the user that is input on the first region and the second region to twelve-dot braille, thereby receiving the braille input.

In addition, the controller may switch a braille input mode into at least one of a Hangul input mode, an English input mode, a number input mode, and a special symbol input mode depending on a preset user input.

In addition, the controller may receive general braille input depending on the touch location of the user in the first mode, and may receive contracted braille input depending on the touch location of the user in the second mode.

In the meantime, the touch screen device may further include a protective film attached on the touch screen, the protective film marking the braille cell in an embossed or engraved form.

According to another aspect, there is provided a control method for a touch screen device, the method including: (A) performing a braille input function for receiving braille input through a touch screen; (B) entering at least one of a first mode and a second mode according to a use direction of the touch screen; and (C) recognizing the touch screen as one braille cell in the first mode, and recognizing the touch screen as two braille cells in the second mode, thereby receiving the braille input depending on a touch location of a user.

Here, step (B) may include: entering the first mode when the touch screen is used in a longitudinal direction, and step (C) may include: matching the touch location of the user to six-dot braille based on both four sides of the touch screen and a virtual division line dividing the touch screen, thereby receiving the braille input.

In addition, step (B) may include: entering the second mode when the touch screen is used in a transverse direction, and step (C) may include: dividing the touch screen into a first region and a second region, and matching the touch location of the user that is input on the first region and the second region to twelve-dot braille, thereby receiving the braille input.

In addition, step (C) may include: recognizing an initially touched point or an initially dragged line within four sides of the touch screen as a criterion dot, which is a dot 2 or 5 at a middle of six dots, or a middle criterion line, and recognizing a point touched above the criterion line or the criterion dot as a dot 1 or 4 of the six dots, and recognizing a point touched below the criterion line or the criterion dot as dot 3 or 6, whereby the points correspond to six-dot braille so as to receive the braille input.

In addition, step (C) may include: recognizing a point, of which a location is closest to a left edge line, as one of left dots 1, 2, and 3, the point being touched within four sides of the touch screen, and recognizing the point, of which the location is closest to a right edge line, as one of right dots 4, 5, and 6, thereby receiving the braille input.

In the meantime, the method may further include: recognizing a dot, which is touched once, as being in an ON state, and recognizing the dot as being in an OFF state when the dot in the ON state is touched again, thereby correcting and receiving the braille input.

As described above, according to the touch screen device having a braille support function and control method therefor of the present invention, it is possible to easily and precisely input six-dot braille on the touch screen.

In addition, according to the touch screen device having a braille support function and control method therefor of the present invention, it is possible to easily and precisely input contractions and symbols of a twelve-dot system.

BRIEF DESCRIPTION OF DRAWINGS

FIG. 3 is a table showing Hangul braille.

FIGS. 4 and 5 are tables showing Hangul contracted braille.

DETAILED DESCRIPTION

Figure 1:
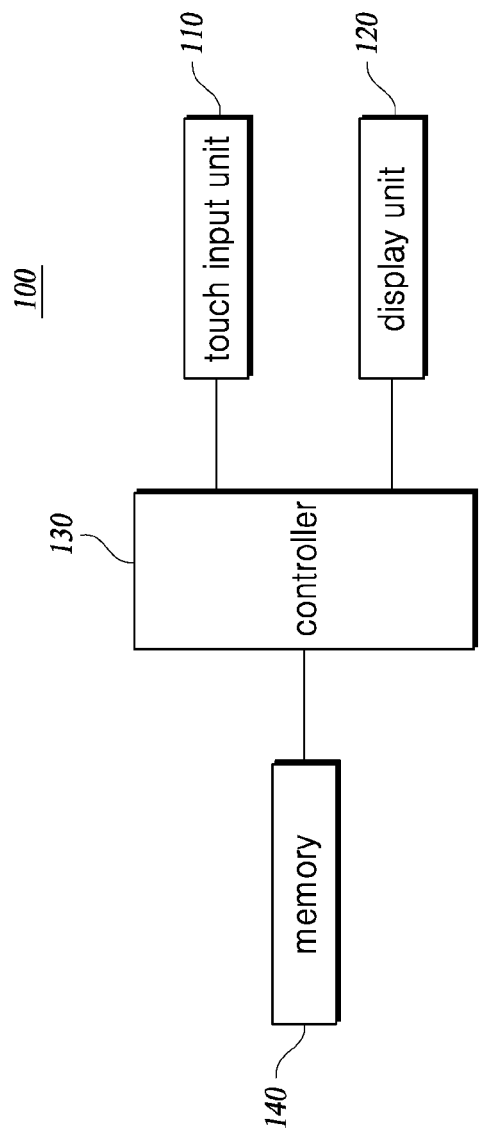
FIG. 1 is a control block diagram showing a touch screen device having a braille support function according to an embodiment of the present invention.

Hereinafter, exemplary embodiments of the present invention will be described in detail with reference to the accompanying drawings. Throughout the drawings, the same reference numerals will refer to the same or like parts, and a repeated description thereof will be omitted.

FIG. 1 is a control block diagram showing a touch screen device having a braille support function according to an embodiment of the present invention.

As shown in FIG. 1, a touch screen device includes: a touch input unit 110 for an touch input of a user; a display unit 120 for display data; a controller 130 processing user input that is input through the touch input unit 110, and displaying the result of the process on the display unit 120; and a memory 140 for storing control data to control each component of the touch input unit, the display unit, and the controller.

When the touch input unit 110 is in contact with body components of a user such as user fingers, etc., the contact is sensed, thereby sensing a touch location of a user. The touch input unit 110 may be configured in various types such as a capacitive type, an infrared type, a resistive type, an acoustic wave type, etc. depending on a sensing type of user input.

The display unit 120 displays data according to control of the controller 130. The touch input unit 110 is laminated on the display unit 120 such that a touch location of a user is sensed while providing a screen, whereby a touch screen 100 is provided.

The memory 140 stores both braille system recognition information for a braille screen being provided through the touch screen 100, and a control program for processing input such as letters, numbers, symbols, word spacing, etc. by recognizing user input according to a braille system recognition method.

Based on the control program stored in the memory 140, the controller 130 may provide an electronic input function using the touch screen 100. The controller 130 recognizes braille, which is input by a user, by distinguishing use modes as a first direction and a second direction according to a use direction of the touch screen 100.

Figure 2:
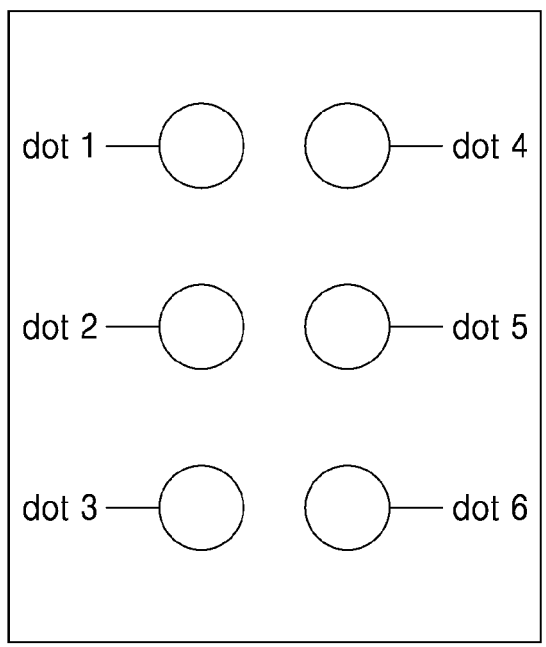
FIG. 2 is a view showing configurations of braille.

FIG. 2 is a view showing an example of configurations of braille input that is received by the controller 130.

Referring to FIG. 2, braille consists of six dots (longitudinally 3 dots, transversely 2 dots). The six dots have respective unique numbers that are dots 1-2-3 from upper left to lower left and dots 4-5-6 from upper right to lower right. According to a word system, braille consists of 64 different dot shapes depending on the number and locations of dots that are selectively embossed in a rectangular braille cell, and a letter system is formed through a successive combination thereof.

FIG. 3 is a braille table showing initial consonants and final consonants of Hangul. In Hangul, one of 64 dot shapes, which is a blank having no dots, is used to space words, and the other 63 dot shapes are used by being allocated to 13 initial consonants (initial sound), 14 final consonants (final position group), 21 vowels, 27 contractions, 7 abbreviations, numbers, punctuation marks, etc.

Figure 4:
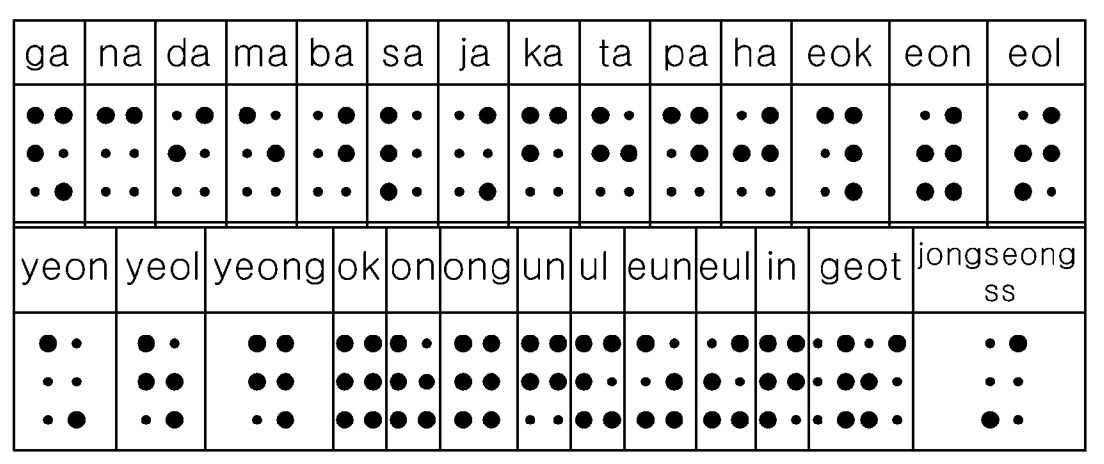
Figure 5:
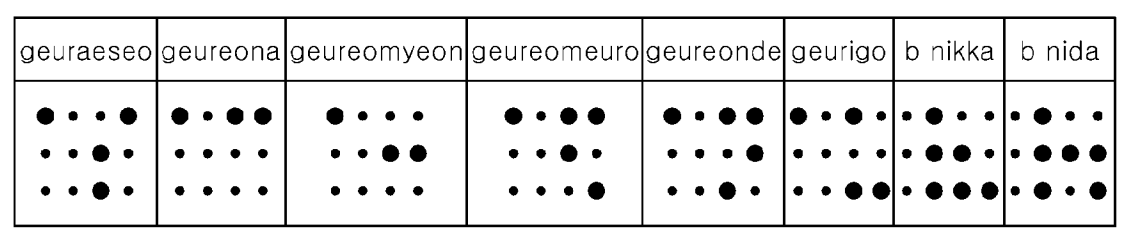

FIG. 4 is a table showing type-1 contracted braille, and FIG. 5 is a table showing type-2 contracted braille.

The type-1 contracted braille is related to monosyllabic words, and the type-2 contracted braille is related to polysyllabic words. As shown in FIGS. 4 and 5, 'geot (것)' of the type-1 contractions and the type-2 contractions are designated in a twelve-dot system.

The controller 130 may enter a first mode for recognizing six dots, and a second mode for recognizing 12 dots according to a use direction of the touch screen 100 so as to recognize user input.

Figure 6:
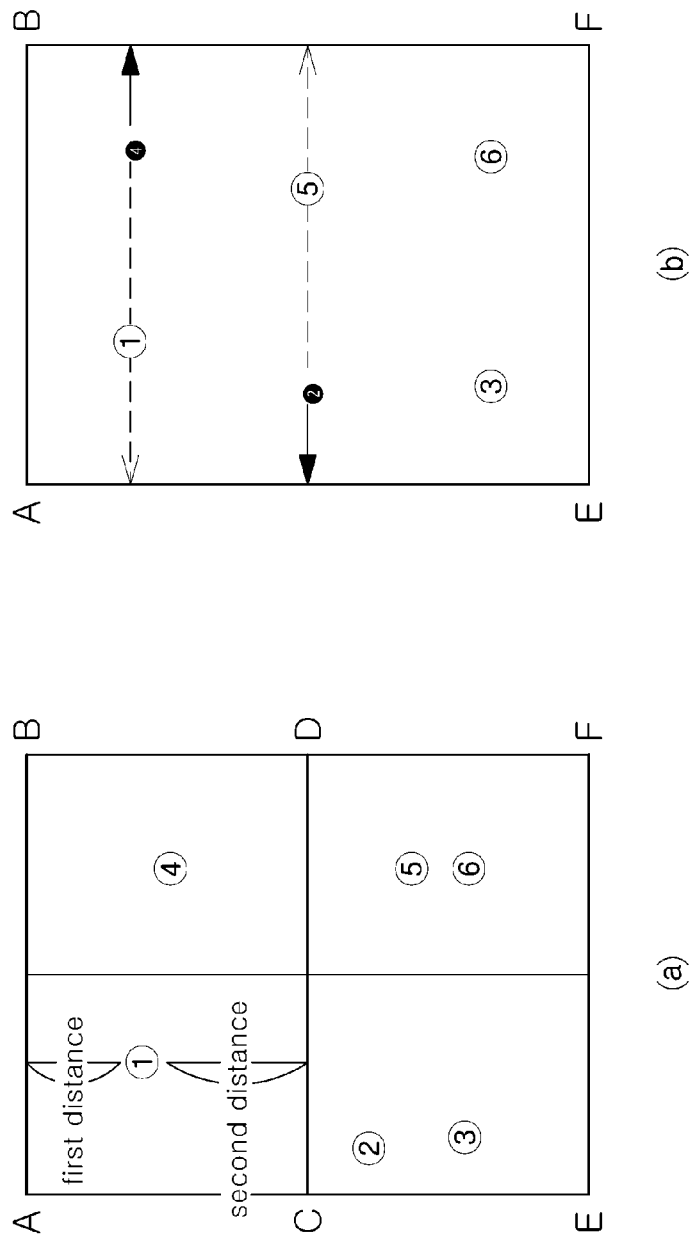
FIG. 6 is a view showing an example of a braille input method according to a first exemplary embodiment of the present invention.

FIG. 6 is a view showing an example of a braille input method according to a first exemplary embodiment of the present invention, and shows an example of a braille input recognition method in the first mode where the touch screen 100 is used in a longitudinal direction.

As shown in FIG. 6, in the first mode where the touch screen 100 is used in the longitudinal direction, the controller 130 recognizes the touch screen 100 as one braille cell.

As shown in FIG. 6(a), the controller 130 recognizes six dots that are input by a user on the touch screen 100 horizontally and vertically divided into 4 regions, whereby letters, numbers, special symbol, etc. may be input by a user.

Based both edge lines ABEF of four sides of the touch screen 100 and a lateral division line CD, the controller 130 may recognize six dots based on which line is closest to a location of user input.

For example, when a point is located above the middle line CD, a distance to the upper line AB (first distance) is compared with a distance to the middle line CD (second distance), whereby a point closest to the line CD may be recognized as a dot 2 or 5 at the middle of six dots, and a point closest to the upper line AB may be recognized as a dot 1 or 4 of six dots.

In addition, when a point is located below the middle line CD, a distance to the lower line EF is compared with a distance to the middle line CD, whereby a point closest to the line CD may be recognized as a dot 2 or 5, and a point closest to the lower line EF may be recognized as a dot 3 or 6.

In addition, as shown in FIG. 6(b), the controller 130 may recognize a point as a left dot (1, 2, 3) or a right dot (4, 5, 6) based on which line of the left edge line AE and the right edge line BF is closest to the point.

Figure 7:
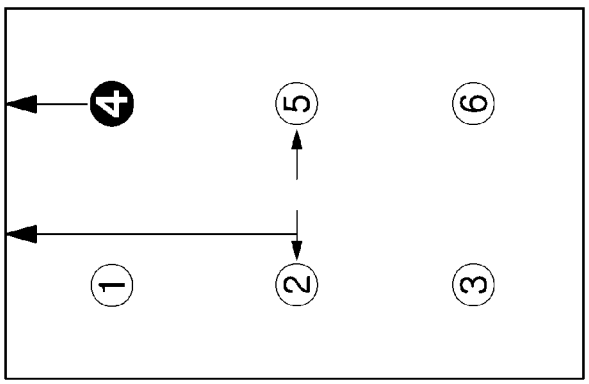
FIGS. 7 and 8 are views showing an example of a braille input method at variable positions according to an embodiment of the present invention.
Figure 7:
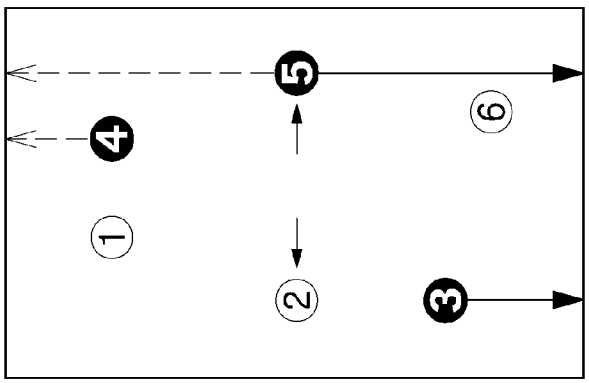
Figure 7:
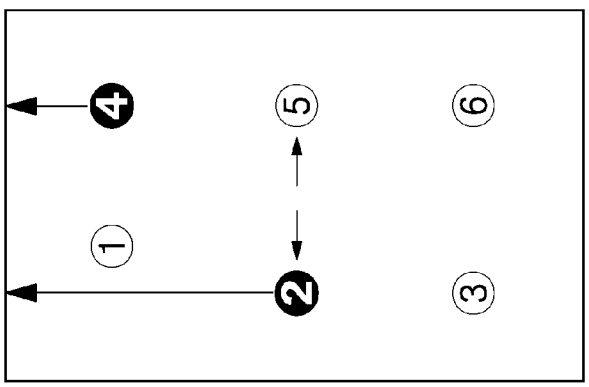
Figure 8:
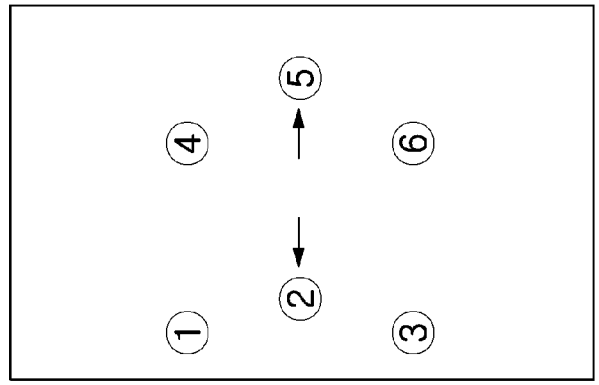
Figure 8:
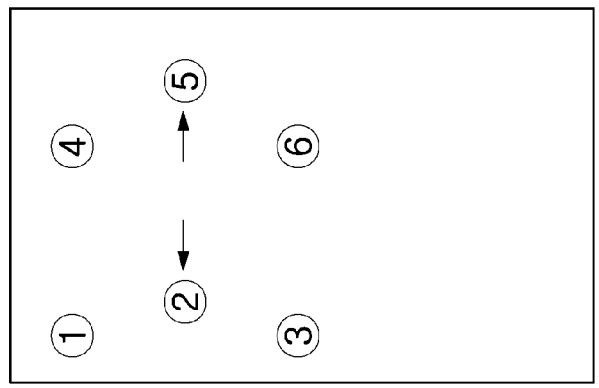
Figure 8:
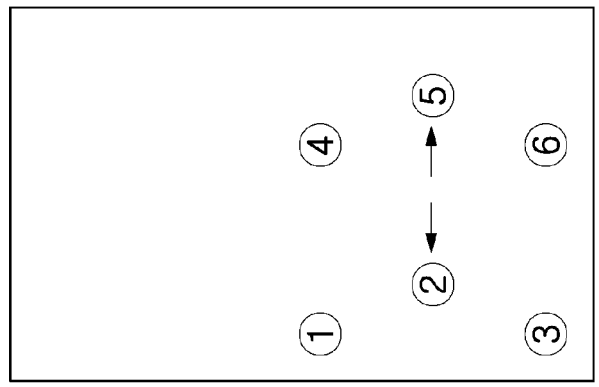

FIGS. 7 and 8 are views showing an example of a braille input method at variable positions according to an embodiment of the present invention.

Referring to FIGS. 7 and 8, in a first or second mode, the controller 130 recognizes an initially touched point or an initially dragged line within edge lines of four sides of the touch screen as a dot 2 or 5 at a middle of six dots, or a middle criterion line.

Next, the controller 130 compares the location of a touched point with the location of a criterion dot or a criterion line. A point closer to the upper edge line rather than the criterion line or the criterion point, or a point touched above the criterion line is recognized as a dot 1 or 4. A point closer to the criterion line or the criterion dot rather than the lower edge line, or a point touched below the criterion line is recognized as a dot 3 or 6.

As described above, the controller 130 variably sets a criterion line depending on user input such that it is possible to receive top, middle, bottom braille input at any location on the touch screen 100.

Figure 9:
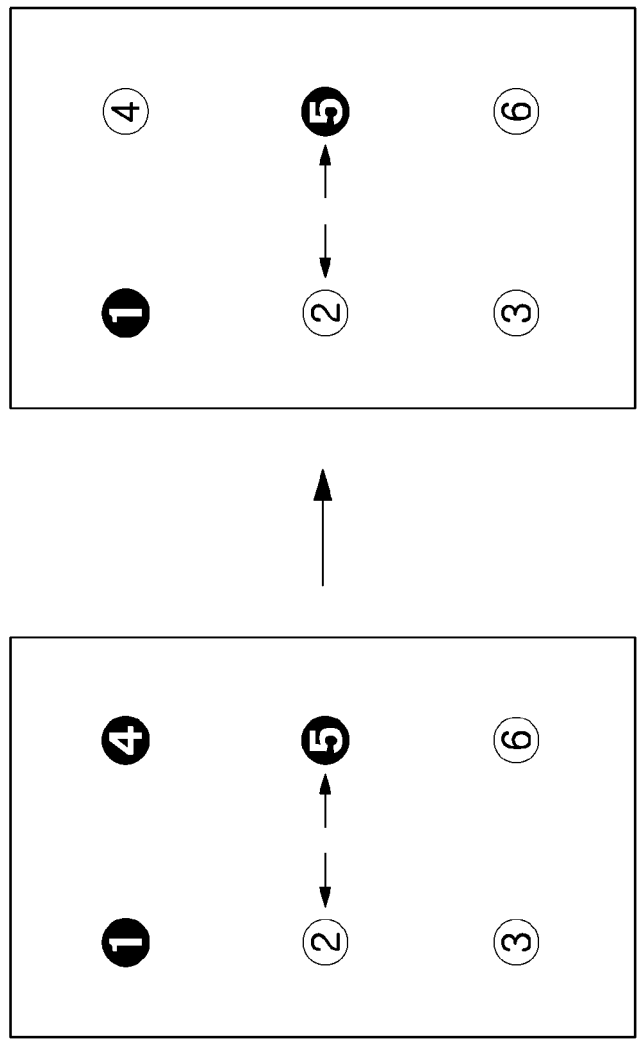
FIG. 9 is a view showing an example of a braille correction method according to an embodiment of the present invention.

FIG. 9 is a view showing an example of a braille correction method according to an embodiment of the present invention, and shows an example of a process of correcting "P (ㅍ)" into "M (ㅁ)".

When correcting braille that is miswritten during the input according to an embodiment of the present invention, the controller 130 recognizes a dot that is touched once as being in an ON state, and recognizes the dot as being in an OFF state when the dot in the ON state is touched again, thereby correcting braille that is miswritten during the input.

As shown in FIG. 9, when touching the dots 5, 1, and 4 on the touch screen 100, the dots 5, 1, and 4 are recognized as being turned on, whereby the controller 130 may recognize "P (ㅍ)" of a six-dot system.

Here, when a user touches the dot 4 again after dragging the middle line as a means of correction, the previously touched dot 4 is recognized as being turned off, whereby the controller 130 recognizes only the dots 1 and 5. Consequently, "P (ㅍ)" that is originally input may be corrected into "M (ㅁ)".

Figure 10:
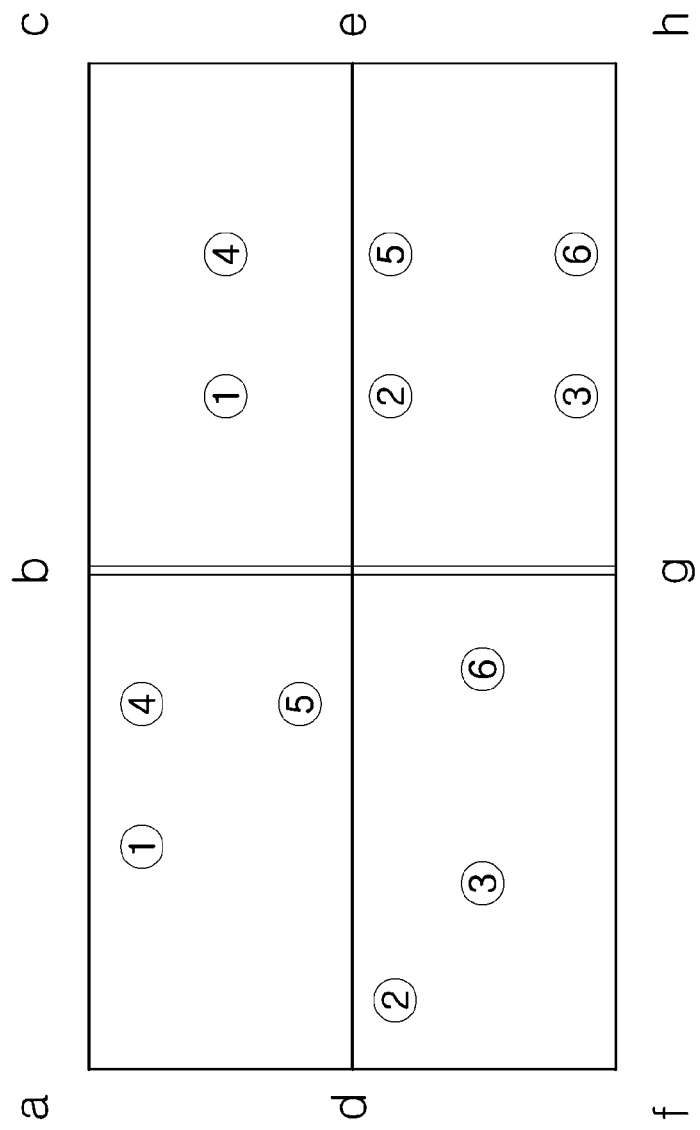
FIG. 10 is a view showing an example of a braille input method according to a second exemplary embodiment of the present invention.

FIG. 10 is a view showing an example of a braille input method according to a second exemplary embodiment of the present invention, and shows an example of a braille input recognition method in the second mode where the touch screen 100 is used in a transverse direction.

As shown in FIG. 10, in the second mode where the touch screen 100 is used in the transverse direction, the controller 130 recognizes the touch screen 100 as two braille cells by switching into an abbreviation input mode.

The controller 130 may divide the touch screen 100 into two left and right braille cells, and may recognize six dots being input on respective braille cells, thereby receiving abbreviation from a user.

Based on edge lines acfh of four sides of the touch screen 100, a longitudinal division line bg, and a lateral division line de, the controller 130 may recognize six dots based on which line is closest to a location of user input.

For example, a point closest to the middle line de may be recognized as a dot 2 or 5 at the middle of six dots, and a point closest to the upper line ab may be recognized as a dot 1 or 4 of the six dots. In addition, a point closest to the lower line fg may be recognized as a dot 3 or 6 at the bottom of the six dots. In addition, a point closest to the line be may be recognized as a dot 1 or 4 at the subsequent six dots, and a point closest to the line gh may be recognized as a dot 3 or 6 at the subsequent six dots.

In addition, a point that is input on a region between the line of and the line bg may be recognized as a left six-dot, and a point that is input on a region between the line bg and the line may be recognized as a right six-dot.

In the meantime, the controller 130 may perform a function such as space, backspace, enter, etc. depending on preset user input, for example, longitudinally or laterally dragging or pinching in/out on the touch screen 100, etc.

In addition, the controller 130 may switch an input mode of the touch screen 100 into at least one of Hangul, English, number, and special symbol modes depending on preset user input. For example, the Hangul, English, number, special symbol modes are set for respective sides of a virtual figure. When the relevant side is dragged, the modes may be switched. Alternatively, respective input modes are set for four sides of the touch screen 100, and the input modes may be switched depending on drag input that is a direction from a specific edge of the touch screen 100 to the inside of the screen, or, a direction from the inside of the screen to the edge of the touch screen 100.

In the meantime, a protective film is attached on the touch screen 100 so as to mark the line CD (referring FIG. 5) or the line bg and the line de (referring to FIG. 6), which divide the touch screen 100, in an embossed or engraved form, whereby a user may easily recognize braille input regions.

Figure 11:
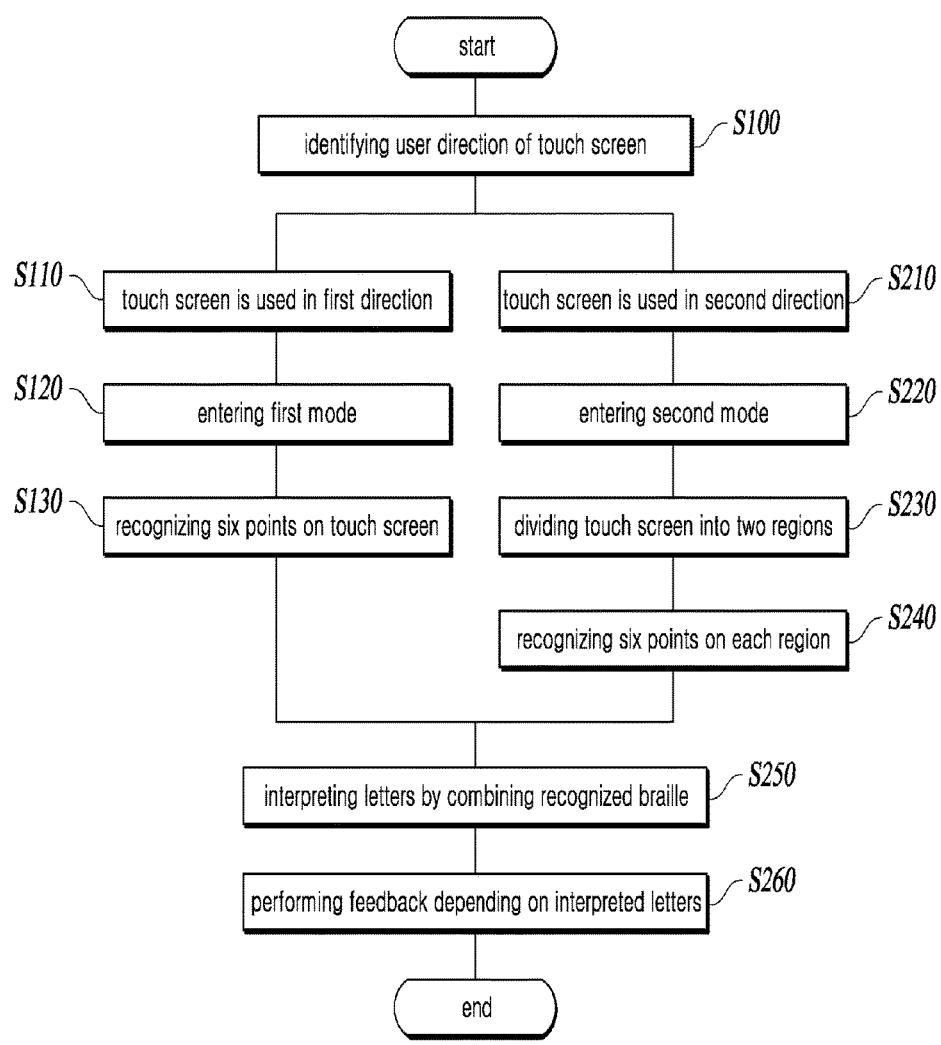
FIG. 11 is a control flowchart of a touch screen device having a braille support function according to an embodiment of the present invention.

FIG. 11 is a control flowchart of the touch screen 100 device having a braille support function according to an embodiment of the present invention.

When a braille input function is performed, the controller 130 identifies a use direction of the touch screen 100 at step S100. The controller 130 indentifies whether the touch screen 100 is used in a first direction or in a second direction, and here, the first direction may be a longitudinal direction and the second direction may be a transverse direction.

When identifying that the touch screen 100 is used in the first direction, namely in the longitudinal direction at step S110, the controller 130 enters the first mode at step S120.

The longitudinal direction is a state where the vertical length of the touch screen 100 is longer than the horizontal length of the touch screen. In the first mode, the controller 130 recognizes the entire touch screen 100 as one braille cell. Next, the controller 130 recognizes six points that are input on the touch screen 100 by a user at step S130. Here, based on both the edge line ABEF of the four sides of the touch screen 100 and the lateral division line CD, the controller 130 recognizes the six points based on which line is closest to the location of user input.

When identifying that the touch screen 100 is used in the second direction, namely in the transverse direction at step S210, the controller 130 enters the second mode at step S220.

The transverse direction is a state where the horizontal length of the touch screen 100 is longer than the vertical length of the touch screen. In the second mode, the controller 130 recognizes the entire touch screen 100 as two braille cells by dividing the touch screen into two regions at step S230. Next, the controller 130 recognizes 12 points, of which six points are input on one region.

Next, the controller 130 interprets the letters that are input by combining the recognized braille at step S250. The controller 130 may recognize braille input in the first mode as braille of a six-dot system, and may recognize braille input in the second mode as abbreviations of a twelve-dot system.

The controller 130 performs a feedback depending on the interpreted letters at step S260. The controller 130 may write text messages, or may output voice depending on the input braille.

Those who are ordinarily skilled in the art will appreciate that various alternatives, modifications, and equivalents are possible, without changing the spirit or essential features of the present invention. Therefore, preferred embodiments of the present invention have been described for illustrative purposes, and should not be construed as being restrictive. The scope of the present invention is defined by the accompanying claims rather than the description which is presented above. Moreover, the present invention is intended to cover not only the exemplary embodiments, but also various alternatives, modifications, equivalents and other embodiments that may be included within the spirit and scope of the present invention as defined by the appended claims.

The invention claimed is:

1. A touch screen device comprising:
a touch screen sensing a touch location of a user; and
a controller entering at least one of a first mode and a second mode according to a use direction of the touch screen, the controller recognizing the touch screen as one braille cell in the first mode, and recognizing the touch screen as two braille cells in the second mode, thereby receiving braille input depending on the touch location of the user,
wherein the controller enters the first mode when the touch screen is used in a longitudinal direction, and matches the touch location of the user to six-dot braille based on both four sides of the touch screen and a virtual division line dividing the touch screen, thereby receiving the braille input.

2. A touch screen device comprising:
a touch screen sensing a touch location of a user; and
a controller entering at least one of a first mode and a second mode according to a use direction of the touch screen, the controller recognizing the touch screen as one braille cell in the first mode, and recognizing the touch screen as two braille cells in the second mode, thereby receiving braille input depending on the touch location of the user,
wherein the controller enters the second mode when the touch screen is used in a transverse direction, divides the touch screen into a first region and a second region, and matches the touch location of the user that is input on the first region and the second region to twelve-dot braille, thereby receiving the braille input.

3. The touch screen device of claim 1, wherein the controller switches a braille input mode into at least one of a Hangul input mode, an English input mode, a number input mode, and a special symbol input mode depending on a preset user input.

4. The touch screen device of claim 1, wherein the controller receives general braille input depending on the touch location of the user in the first mode, and receives contracted braille input depending on the touch location of the user in the second mode.

5. The touch screen device of claim 1, further comprising:
a protective film attached on the touch screen, the protective film marking the braille cell in an embossed or engraved form.

6. A control method for a touch screen device, the method comprising:
(A) performing a braille input function for receiving braille input through a touch screen;
(B) entering at least one of a first mode and a second mode according to a use direction of the touch screen; and
(C) recognizing the touch screen as one braille cell in the first mode, and recognizing the touch screen as two braille cells in the second mode, thereby receiving the braille input depending on a touch location of a user,
wherein step (B) includes: entering the first mode when the touch screen is used in a longitudinal direction, and
step (C) includes: matching the touch location of the user to six-dot braille based on both four sides of the touch screen and a virtual division line dividing the touch screen, thereby receiving the braille input.

7. A control method for a touch screen device, the method comprising:
(A) performing a braille input function for receiving braille input through a touch screen;
(B) entering at least one of a first mode and a second mode according to a use direction of the touch screen; and
(C) recognizing the touch screen as one braille cell in the first mode, and recognizing the touch screen as two braille cells in the second mode, thereby receiving the braille input depending on a touch location of a user,
wherein step (B) includes: entering the second mode when the touch screen is used in a transverse direction, and
step (C) includes: dividing the touch screen into a first region and a second region, and matching the touch location of the user that is input on the first region and the second region to twelve-dot braille, thereby receiving the braille input.

8. The method of claim 6, wherein step (C) includes:
recognizing an initially touched point or an initially dragged line within four sides of the touch screen as a criterion dot, which is a dot 2 or 5 at a middle of six dots, or a middle criterion line, and recognizing a point touched above the criterion line or the criterion dot as a dot 1 or 4 of the six dots, and recognizing a point touched below the criterion line or the criterion dot as a dot 3 or 6, whereby the points correspond to six-dot braille so as to receive the braille input.

9. The method of claim 6, wherein step (C) includes
recognizing a point, of which a location is closest to a left edge line, as one of left dots 1, 2, and 3, the point being touched within four sides of the touch screen, and
recognizing the point, of which the location is closest to a right edge line, as one of right dots 4, 5, and 6, thereby receiving the braille input.

10. The method of claim 6, further comprising:
recognizing a dot, which is touched once, as being in an ON state, and recognizing the dot as being in an OFF state when the dot in the ON state is touched again, thereby correcting and receiving the braille input.

11. The touch screen device of claim 2, wherein the controller switches a braille input mode into at least one of a Hangul input mode, an English input mode, a number input mode, and a special symbol input mode depending on a preset user input.

12. The touch screen device of claim 2, wherein the controller receives general braille input depending on the touch location of the user in the first mode, and receives contracted braille input depending on the touch location of the user in the second mode.

13. The touch screen device of claim 2, further comprising:
 a protective film attached on the touch screen, the protective film marking the braille cell in an embossed or engraved form.

14. The method of claim 7, wherein step (C) includes:
 recognizing an initially touched point or an initially dragged line within four sides of the touch screen as a criterion dot, which is a dot 2 or 5 at a middle of six dots, or a middle criterion line, and recognizing a point touched above the criterion line or the criterion dot as a dot 1 or 4 of the six dots, and recognizing a point touched below the criterion line or the criterion dot as a dot 3 or 6, whereby the points correspond to six-dot braille so as to receive the braille input.

15. The method of claim 7, wherein step (C) includes
 recognizing a point, of which a location is closest to a left edge line, as one of left dots 1, 2, and 3, the point being touched within four sides of the touch screen, and
 recognizing the point, of which the location is closest to a right edge line, as one of right dots 4, 5, and 6, thereby receiving the braille input.

16. The method of claim 7, further comprising:
 recognizing a dot, which is touched once, as being in an ON state, and recognizing the dot as being in an OFF state when the dot in the ON state is touched again, thereby correcting and receiving the braille input.

\* \* \* \* \*